US012237593B2

(12) United States Patent
Ni et al.

(10) Patent No.: US 12,237,593 B2
(45) Date of Patent: Feb. 25, 2025

(54) EXTERNAL WIDEBAND ANTENNA AND WIRELESS COMMUNICATION DEVICE

(71) Applicant: SPREADTRUM COMMUNICATIONS (SHANGHAI) CO., LTD., Shanghai (CN)

(72) Inventors: Bei Ni, Shanghai (CN); Mingbo Liu, Shanghai (CN); Xuan Zhang, Shanghai (CN); Xiaoyan Li, Shanghai (CN); Ruzhong Liu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 135 days.

(21) Appl. No.: 17/868,751

(22) Filed: Jul. 19, 2022

(65) Prior Publication Data

US 2022/0368023 A1 Nov. 17, 2022

Related U.S. Application Data

(63) Continuation-in-part of application No. PCT/CN2021/076297, filed on Feb. 9, 2021.

(30) Foreign Application Priority Data

Jan. 20, 2020 (CN) ......................... 202010065923.0
Jan. 20, 2020 (CN) ......................... 202020143172.5

(51) Int. Cl.
*H01Q 9/40* (2006.01)
*H01Q 5/25* (2015.01)

(52) U.S. Cl.
CPC ................ *H01Q 9/40* (2013.01); *H01Q 5/25* (2015.01)

(58) Field of Classification Search
CPC ............ H01Q 5/25; H01Q 5/357; H01Q 9/30; H01Q 9/40
See application file for complete search history.

(56) References Cited

U.S. PATENT DOCUMENTS 7,061,442 B1 * 6/2006 Tang ........................ H01Q 5/28 343/770
7,132,985 B2 11/2006 Lin
(Continued)

FOREIGN PATENT DOCUMENTS

CN 101409383 A 4/2009
CN 107293853 A 10/2017
(Continued)

OTHER PUBLICATIONS

WIPO, International Search Report and Written Opinion for International Application No. PCT/CN2021/076297, Apr. 25, 2021.
(Continued)

*Primary Examiner* — Dameon E Levi
*Assistant Examiner* — Leah Rosenberg
(74) *Attorney, Agent, or Firm* — HAUPTMAN HAM, LLP

(57) ABSTRACT

An external wideband antenna and a wireless communication device are provided in the disclosure. The external wideband antenna includes a radio frequency (RF) coaxial cable, and a first antenna body and a second antenna body which are electrically connected with the RF coaxial cable respectively, where an outer contour of the first antenna body and an outer contour of the second antenna body cooperate to define a tapered slot. In the external wideband antenna provided the disclosure, the outer contour of the first antenna body and the outer contour of the second antenna body cooperate to define the tapered slot, which facilitates
(Continued)

generation of a strong coupling current, and in turn a broadening of antenna bandwidth.

12 Claims, 4 Drawing Sheets

(56) References Cited

U.S. PATENT DOCUMENTS

2002/0122010 A1 9/2002 Mccorkle
2007/0229360 A1* 10/2007 Yanagi ..................... H01Q 1/38 343/846
2008/0266182 A1 10/2008 Teshima
2010/0265146 A1 10/2010 Montgomery et al.
2011/0156981 A1 6/2011 Ridgeway
2012/0154221 A1* 6/2012 McCorkle ............ H01Q 13/085 343/700 MS
2015/0045089 A1* 2/2015 He ......................... H01Q 21/30 455/552.1
2018/0054001 A1* 2/2018 Fujimoto ............. H01Q 9/0428
2019/0027821 A1 1/2019 Judkins et al.
2023/0098170 A1* 3/2023 Oka ......................... H01Q 9/40 343/702
2023/0187838 A1* 6/2023 Brock ...................... H01Q 1/42 343/767

FOREIGN PATENT DOCUMENTS

CN 209282404 U 8/2019
WO WO-2002013313 A2 * 2/2002

OTHER PUBLICATIONS

Extended European Search Report issued for EP application No. 21743739.1 mailed on Jan. 25, 2024, 7 Pages.

* cited by examiner

EXTERNAL WIDEBAND ANTENNA AND WIRELESS COMMUNICATION DEVICE

CROSS-REFERENCE TO RELATED APPLICATIONS

This application is a continuation-in-part of International Application No. PCT/CN2021/076297, filed Feb. 9, 2021, which claims priority to Chinese Patent Application No. 202010065923.0, filed Jan. 20, 2020, and Chinese Patent Application No. 202020143172.5, filed Jan. 20, 2020, the entire disclosures of which are incorporated herein by reference.

TECHNICAL FIELD

This application relates to the field of wireless communication, and in particular, to an external wideband antenna and a wireless communication device.

BACKGROUND

Compared with a second generation communication system, a third generation mobile communication system, and a fourth generation communication technology of long term evolution (LTE) system, fifth-generation mobile communication technology (5G for short) has higher wireless transmission speed and higher transmission quality, which can provide richer and faster wireless multimedia services, and enable users to have a better mobile broadband Internet experience.

5G mobile communication devices need to be compatible with fourth-generation mobile communication systems such as frequency division duplex (FDD), time division duplex (TDD), and wireless fidelity (Wi-Fi) communication systems such as Wi-Fi 2.4G and Wi-Fi 5G. As such, as an antenna device for emitting and receiving radio signals in the mobile communication device, it needs to be designed to meet requirements in multi-frequency and operating bandwidth of systems such as Wi-Fi 2.4G, Wi-Fi 5G, FDD, TDD, N77, N78, and N79.

SUMMARY

An external wideband antenna includes a radio frequency (RF) coaxial cable, and a first antenna body and a second antenna body which are electrically connected with the RF coaxial cable respectively. An outer contour of the first antenna body and an outer contour of the second antenna body cooperate to define a tapered slot.

A wireless communication device includes the external wideband antenna described in any of the above implementations.

DETAILED DESCRIPTION

The disclosure is further described hereinafter with reference to implementations, but the disclosure is not therefore limited to the scope of the described implementations.

An external wideband antenna 10 and a wireless communication device 60 are provided in the disclosure to solve a technical problem that multi-band and wide-band performances of antennas in the related art needs to be improved.

The above problem is solved by the disclosure with accordance to technical solutions described hereinafter.

Figure 1:
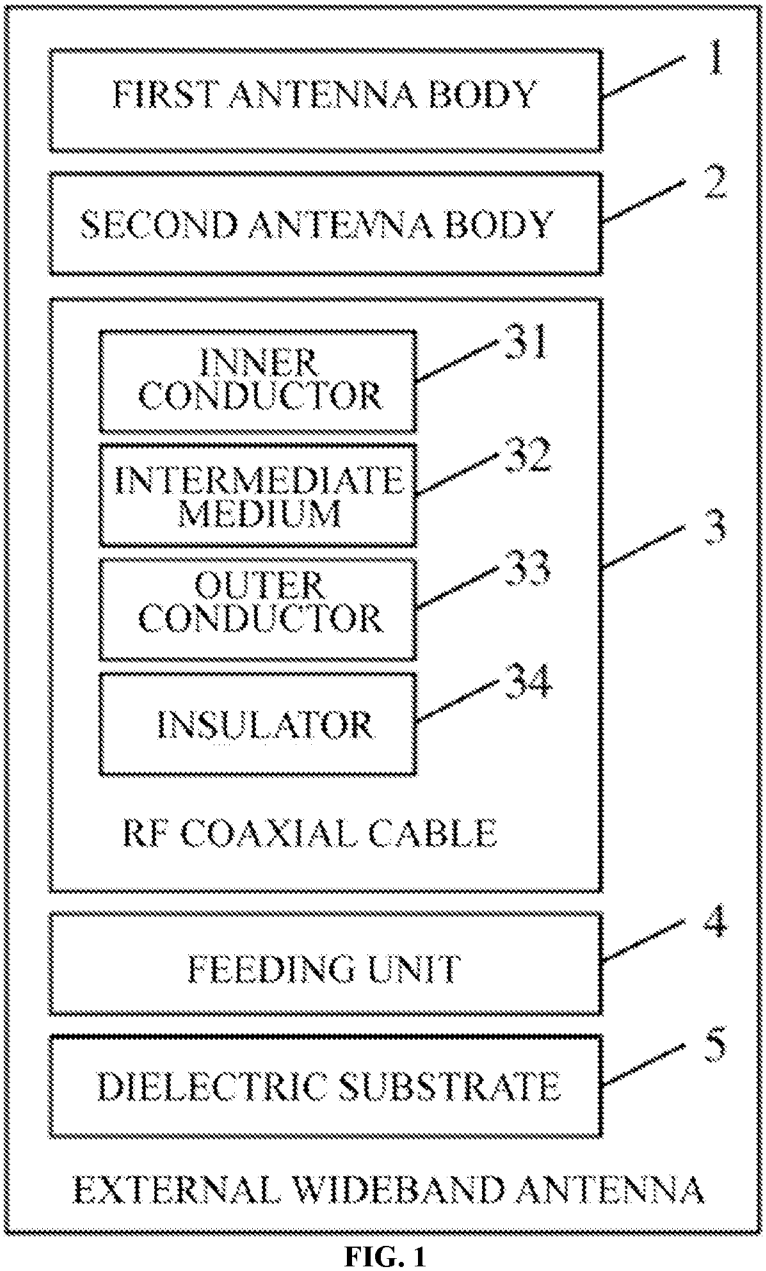
FIG. 1 is a schematic diagram of an external wideband antenna provided according to an implementation of the disclosure.

An external wideband antenna is provided in an implementation. Referring to FIG. 1, the external wideband antenna in this implementation includes a first antenna body 1, a second antenna body 2, and a radio frequency (RF) coaxial cable 3.

Figure 2:
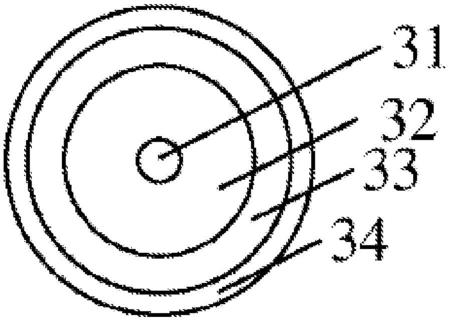
FIG. 2 is a schematic cross-sectional view of a radio frequency (RF) coaxial cable in the external wideband antenna provided according to an implementation of the disclosure.

In this implementation, the first antenna body 1 and the second antenna body 2 are electrically connected with the RF coaxial cable 3, respectively. Referring to FIG. 2, the RF coaxial cable 3 includes an inner conductor 31, an intermediate medium 32, an outer conductor 33, and an insulator 34 arranged in sequence from inside to outside. Specifically, in this implementation, the RF coaxial cable 3 is used to introduce wired RF signals. The first antenna body 1 is electrically connected with the inner conductor 31 of the RF coaxial cable 3. The second antenna body 2 is grounded and electrically connected with the outer conductor 33 of the RF coaxial cable 3.

In this implementation, an outer contour of the first antenna body 1 and an outer contour of the second antenna body 2 cooperate to define a tapered slot, which facilitates generation of a strong coupling current, so that a resonant frequency band of the antenna is widened, and thus a larger frequency range can be covered. As an example, in the tapered slot, an interval between the first antenna body and the second antenna body changes smoothly without a sudden change.

Further, in this implementation, the first antenna body 1 may include a tapered outer contour which is beneficial to widening antenna bandwidth, and the second antenna body 2 may also include a tapered outer contour which is beneficial to widening the antenna bandwidth, such that the first antenna body 1 and the second antenna body 2 cooperate to define the tapered slot.

In the external wideband antenna provided the disclosure, the outer contour of the first antenna body 1 and the outer contour of the second antenna body 2 cooperate to define the tapered slot, which facilitates generation of a strong coupling current, and in turn a broadening of antenna bandwidth. As such, multiple frequency bands can be supported, which allows the wireless communication device 60 using the external wideband antenna to compatible with multiple frequency bands of various communication systems.

Further, in this implementation, the outer contour of the first antenna body 1 may be in a shape of ellipse, and part of the outer contour of the second antenna body 2 close to the first antenna body 1 may be in a shape of partial ellipse. In an implementation, an elliptical outer contour of the first antenna body 1 and an elliptical outer contour of the second antenna body 2 cooperate to define the tapered slot. It should be understood that, in this implementation, the outer contours of the first antenna body 1 and the second antenna body 2 are not limited to the above-mentioned elliptical shapes, but may be in any shapes through which a tapered slot can be defined, where the tapered slot is beneficial to widening the antenna bandwidth.

Further, in this implementation, each of the first antenna body 1 and the second antenna body 2 may be in axisymmetric structure. For example, the first antenna body 1 may be elliptical, and the second antenna body 2 may be saddle-shaped. Furthermore, the RF coaxial cable 3 can be arranged on a symmetry axis of the first antenna body 1, or a symmetry axis of the second antenna body 2. As an example, the symmetry axis of the first antenna body 1 can be coincident with the symmetry axis of the second antenna body 2.

Figure 4:
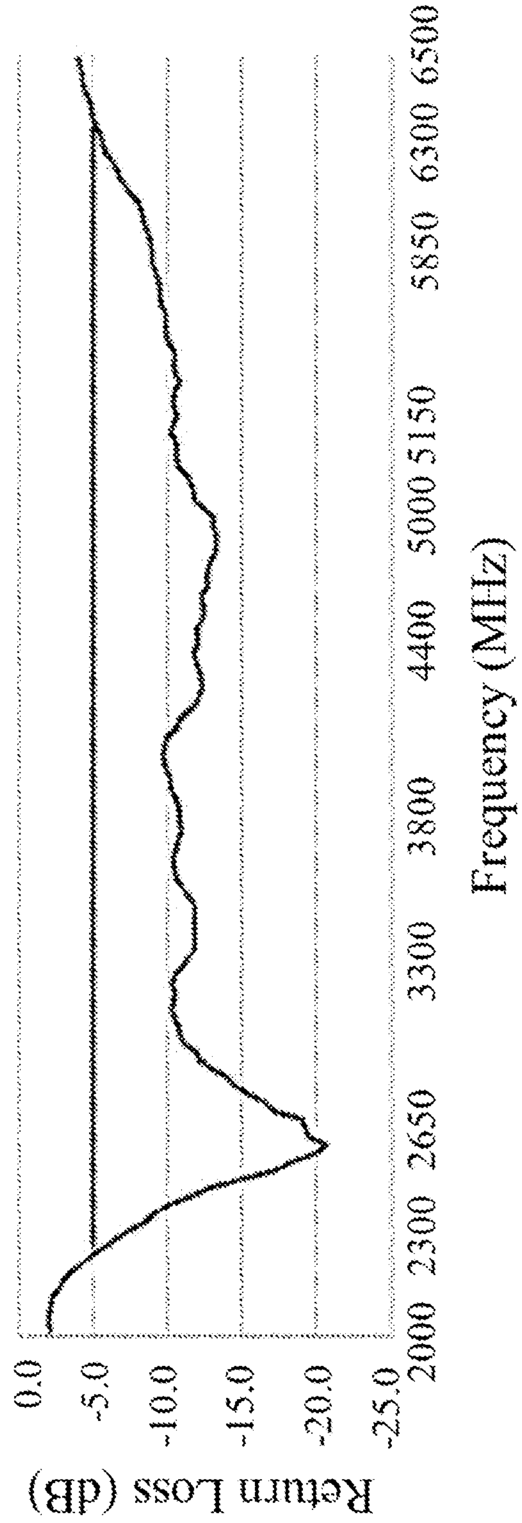
FIG. 4 is a test chart of a return loss of the external wideband antenna provided in FIG. 3.
Figure 5:
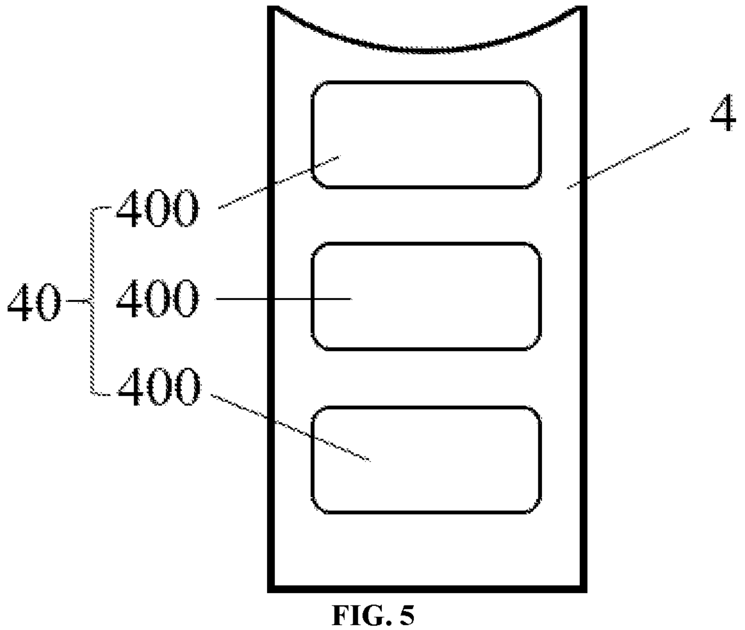
FIG. 5 is a schematic diagram of a feeding unit according to an implementation of the disclosure.

Referring to FIG. 1, in this implementation, the external wideband antenna can also include a feeding unit 4. Specifically, the feeding unit 4 can be used to connect the first antenna body 1 and the inner conductor 31 of the RF coaxial cable 3. As an example, the feeding unit 4 may include a patch component 40 for adjusting antenna impedance. The patch component 40 may include at least one sub-patch component 400. In an implementation, FIG. 4 illustrates a structure of the feeding unit 4. Further, the patch component 40 can include a Zero-Ohm resistor. The Zero-Ohm resistor can be replaced with other components when performance of the external wideband antenna provided in this implementation needs to be adjusted.

For example, when the resonant frequency band of the external wideband antenna needs to be shifted towards a low frequency, the Zero-Ohm resistor can be replaced with other components such as an inductor (whose inductance can be customized according to practical applications). When the resonant frequency band of the external wideband antenna needs to be shifted towards a high frequency, the Zero-Ohm resistor can be replaced with other components such as a capacitor (whose capacitance can be customized according to practical applications). For another example, when it needs to adjust the antenna impedance in a specific frequency band to improve antenna efficiency of the external wideband antenna in this specific frequency band, the Zero-Ohm resistor can be replaced with components such as an inductor (whose inductance can be customized according to practical applications) and a capacitor (whose capacitance can be customized according to practical applications).

Referring to FIG. 1, in this implementation, the external wideband antenna can also include a dielectric substrate 5. Specifically, the dielectric substrate 5 may be made of epoxy resin. The first antenna body 1 and the second antenna body 2 may be attached to the dielectric substrate 5. On the one hand, the dielectric substrate 5 can serve as a support for the first antenna body 1, the second antenna body 2, the RF coaxial cable 3, etc. On the other hand, with aid of the dielectric substrate 5, a dielectric constant is increased, which can achieve a lower resonant frequency under the premise of the same antenna size. Thus, in this implementation, a desired resonant frequency can be achieved with a smaller antenna size. Specifically, in this implementation, the dielectric substrate 5 may have a length ranging from 65 mm to 75 mm and a width ranging from 15 mm to 25 mm.

Figure 3:
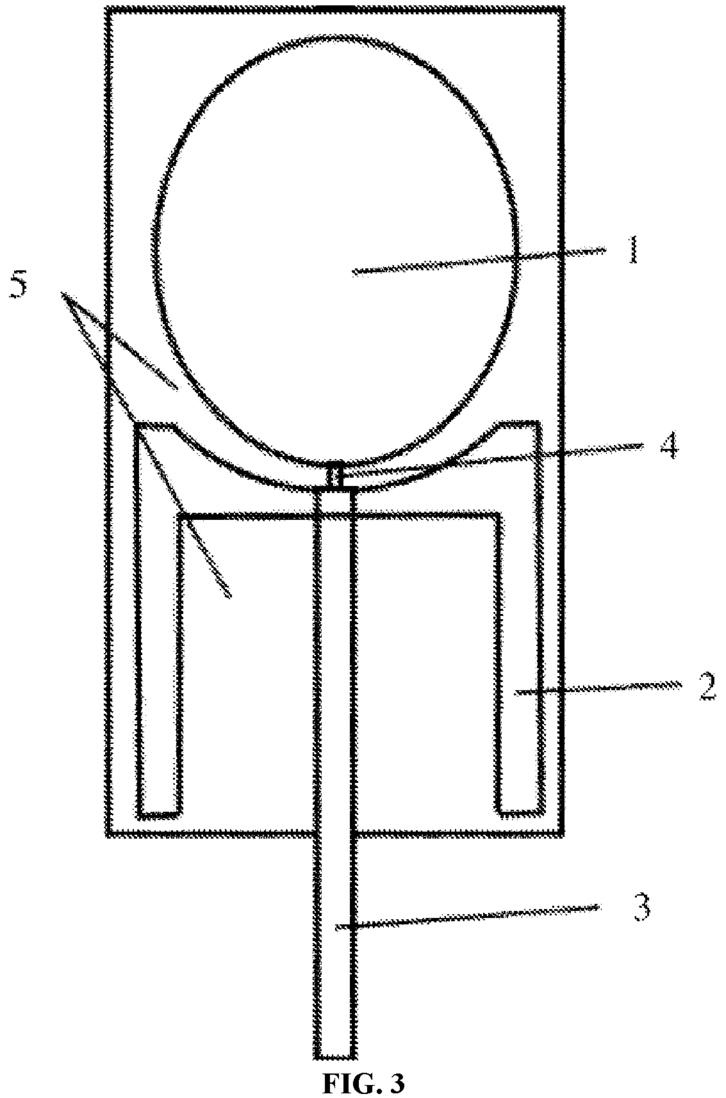
FIG. 3 is a schematic structural diagram of the external wideband antenna provided according to an implementation of the disclosure.

FIG. 3 is a schematic structural diagram of the external wideband antenna provided according to this implementation. In an example, the external wideband antenna has a size of 70 mm*20 mm, that is, the dielectric substrate 5 has a size of 70 mm*20 mm. The first antenna body 1 is elliptical. The second antenna body 2 is saddle-shaped. The first antenna body 1 and the second antenna body 2 are attached to the dielectric substrate 5. The symmetry axis of the first antenna body 1 is coincident with the symmetry axis of the second antenna body 2. The outer contour of the second antenna body 2 is recessed at a part close to the first antenna body 1. A recessed part of the second antenna body 2 and the outer contour of the first antenna body 1 cooperate to define the tapered slot. The RF coaxial cable 3 for introducing external wired RF signals is disposed on a line where the symmetry axes of the first antenna body 1 and the second antenna body 2 are located. Further, the inner conductor 31 of the RF coaxial cable 3 is electrically connected with the first antenna body 1, and the outer conductor 33 is grounded and electrically connected with the second antenna body 2.

In this implementation, based on the external wideband antenna provided in FIG. 3, a frequency band with a minimum value of 2300 MHz and a maximum value of 4000 MHz can be covered in a half-wavelength resonance mode, and a frequency band with a minimum value of 4000 MHz and a maximum value of 6300 MHz can be covered in a full-wavelength resonance mode. Thus, the external wideband antenna has an operating frequency band with a minimum value of 2300 MHz and a maximum value of 6300 MHz, such that the wireless communication device 60 using the broadband location antenna provided in this implementation can be applied to multiple frequency bands such as Wi-Fi 2.4G, Wi-Fi 5G, FDD, TDD, N77, N78, and N79. Further, FIG. 4 illustrates a test chart of a return loss of the external wideband antenna, where in the operating frequency band of the external wideband antenna, return losses are all lower than −5 dB, which can meet requirements of practical applications.

In this implementation, a dipole antenna is optimized, where the first antenna body has a tapered outer contour, which is beneficial to widening the antenna bandwidth. In addition, the outer contour of the first antenna body and the outer contour of the second antenna body define the tapered slot, which is beneficial to further widening the antenna bandwidth. As such, multiple frequency bands can be supported, which allows the wireless communication device 60 using the external wideband antenna to compatible with multiple frequency bands of various communication systems.

Figure 6:
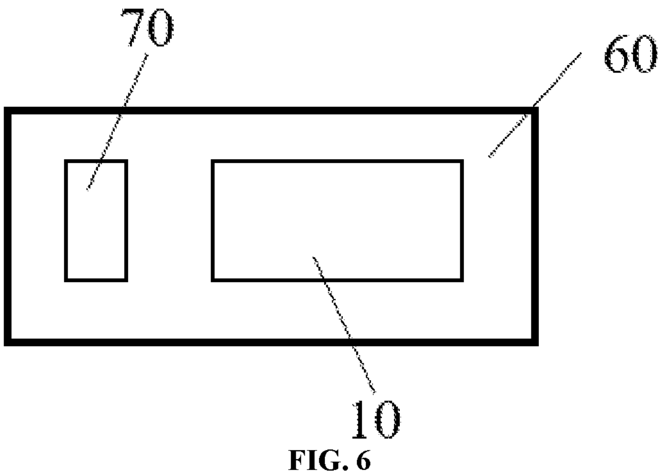
FIG. 6 is a schematic diagram of a wireless communication device according to an implementation of the disclosure.

A wireless communication device 60 is provided in an implementation. The wireless communication device 60 includes a processor 70 and the external wideband antenna provided in any of the above-identified implementations. The external wideband antenna is electrically coupled with the processor 70. The processor 70 is configured to control the external wideband antenna to emit and receive signals. FIG. 6 is a schematic diagram of the wireless communication device 60 according to an implementation of the disclosure. The wireless communication device 60 may include but is not limited to mobile terminals such as mobile phones, tablet computers, notebook computers, and e-books.

Since the external wideband antenna provided in above implementations can support multiple frequency bands, the wireless communication device 60 provided in this implementation can be compatible with multiple frequency bands of various communication systems, and can meet requirements for multi-frequency and broadband.

Those skilled in the art should understand that the implementations of the disclosure described above are merely exemplary, and the protection scope of the disclosure is defined by the appended claims. Various improvements and modifications can be made without departing from the principle of the disclosure to those skilled in the art, and the improvement and the modification are also considered as the protection scope of the disclosure.

What is claimed is:

1. An external wideband antenna, comprising:

a radio frequency (RF) coaxial cable; and a first antenna body and a second antenna body which are electrically connected with the RF coaxial cable respectively, wherein the first antenna body is disposed outside the second antenna body, the second antenna body is disposed outside the first antenna body, and an outer contour of the first antenna body and an outer contour of the second antenna body cooperate to define a tapered slot;

the first antenna body is electrically connected with an inner conductor of the RF coaxial cable; and the second antenna body is grounded and electrically connected with an outer conductor of the RF coaxial cable;

the external wideband antenna further comprises a feeding unit for connecting the first antenna body and the inner conductor;

the feeding unit comprises a patch component for adjusting antenna impedance; and the patch component comprises a Zero-Ohm resistor.

2. The external wideband antenna of claim 1, wherein the outer contour of the first antenna body is in a shape of ellipse, and part of the second antenna body facing the outer contour of the first antenna body is in a shape of partial ellipse; and an elliptical outer contour of the first antenna body and an elliptical outer contour of the second antenna body cooperate to define the tapered slot.

3. The external wideband antenna of claim 1, wherein at least one of the first antenna body or the second antenna body has a tapered outer contour.

4. The external wideband antenna of claim 1, wherein at least one of the first antenna body or the second antenna body is in axisymmetric structure.

5. The external wideband antenna of claim 1, wherein the external wideband antenna further comprises a dielectric substrate, and the first antenna body and the second antenna body are attached to the dielectric substrate.

6. The external wideband antenna of claim 5, wherein the dielectric substrate is made of epoxy resin; and the dielectric substrate has a length ranging from 65 mm to 75 mm and a width ranging from 15 mm to 25 mm.

7. The external wideband antenna of claim 1, wherein the external wideband antenna covers a first frequency band in a half-wavelength resonance mode, and covers a second frequency band in a full-wavelength resonance mode.

8. The external wideband antenna of claim 7, wherein the first frequency band ranges from 2300 MHz to 4300 MHz; and the second frequency band ranges from 4300 MHz to 6300 MHz.

9. A wireless communication device, comprising a processor and an external wideband antenna electrically coupled with the processor, the processor being configured to control the external wideband antenna to emit and receive signals, wherein the external wideband antenna comprises:

a radio frequency (RF) coaxial cable; and a first antenna body and a second antenna body which are electrically connected with the RF coaxial cable respectively, wherein the first antenna body is disposed outside the second antenna body, the second antenna body is disposed outside the first antenna body, and an outer contour of the first antenna body and an outer contour of the second antenna body cooperate to define a tapered slot;

the first antenna body is electrically connected with an inner conductor of the RF coaxial cable; and the second antenna body is grounded and electrically connected with an outer conductor of the RF coaxial cable;

the external wideband antenna further comprises a feeding unit for connecting the first antenna body and the inner conductor;

the feeding unit comprises a patch component for adjusting antenna impedance; and the patch component comprises a Zero-Ohm resistor.

10. The wireless communication device of claim 9, wherein the outer contour of the first antenna body is in a shape of ellipse, and part of the second antenna body facing the outer contour of the first antenna body is in a shape of partial ellipse; and an elliptical outer contour of the first antenna body and an elliptical outer contour of the second antenna body cooperate to define the tapered slot.

11. The wireless communication device of claim 9, wherein at least one of the first antenna body or the second antenna body has a tapered outer contour.

12. The wireless communication device of claim 9, wherein at least one of the first antenna body or the second antenna body is in axisymmetric structure.

* * * * *